United States Patent Office 2,762,735
Patented Sept. 11, 1956

2,762,735
LAMINATED FIBROUS GLASS MATERIAL

Jesse Werner, Holliswood, N. Y., and Robert Steckler, Russell, Ohio, assignors to General Aniline & Film Corporation, New York, N. Y., a corporation of Delaware No Drawing. Application June 16, 1955,
Serial No. 516,022

6 Claims. (Cl. 154—43)

The present invention relates to a laminated article comprising a plurality of sheets of fibrous glass material bonded together with a copolymer of an N-vinyl pyrrolidone and a diallyl ester of dibasic acid.

Various polymers and copolymers have been suggested as bonding agents for glass cloth, glass fibers, glass mats, roving, and the like. Polymers of allyl esters of saturated and unsaturated dibasic acids have been employed in the preparation of fiber glass laminates and glass reinforced plastic objects. Blends of diallyl esters copolymerized with another mono-functional or poly-functional vinyl monomer have yielded a wide variety of cross-linked copolymers which have been suggested as reinforcing or bonding agents for glass laminates.

The principal disadvantage of such polymers and copolymers, when employed as a laminating agent, is that the resulting cured polymer or copolymer has poor adhesion to glass cloth, glass fibers, glass mats, and the like. If glass cloth, mats or glass fibers are impregnated with such polymers and copolymers and built into laminates followed by final curing, the laminates do not exhibit their optimum properties such as flexural strength and modulus of elasticity.

It is an object of the present invention to provide a new heat curable copolymeric resin having the unexpected property of promoting the adhesion of the cured resin to glass cloth, glass fiber, glass mats, and the like.

The proper adhesion of the resin to glass fibers and the like is essential to the obtainment of maximum physical properties. In the past, this has been partially accomplished by preheating the glass fibers and the like with products, such as vinyl silanes. The necessity of improving physical properties cannot be overstressed, since this is a very important factor in the glass laminating industry.

We have found that by using well defined copolymers of an N-vinyl pyrrolidone with a diallyl ester of a dibasic acid, the preheating of glass fibers is not necessary thus allowing a direct preparation of glass fiber laminates having maximum physical characteristics. The N-vinyl pyrrolidone actually enters into and is an integral part of the final cured polymer. Attempts to add an N-vinyl pyrrolidone to a solution containing an already formed prepolymer of a diallyl ester of a dibasic acid are not too successful due to loss of N-vinyl pyrrolidone during solvent evaporation. This makes the preparation of coated sheets, especially for dry lay-up, impractical.

It is known in the synthetic resin art that diallyl phthalate forms initially a partial or β-polymer. As the polymerization proceeds, the amount of β-polymer increases, and is followed by molecular cross-linking and gelation. We have found that best results are obtained if the N-vinyl pyrrolidone is incorporated prior to the formation of the "β-polymer" stage. We have also found that the copolymers obtained by copolymerizing 5 to 20% by weight of an N-vinyl pyrrolidone and 80 to 95% by weight of a diallyl ester of a dibasic acid yield, after final curing, a resin possessing extremely high adhesion to glass cloth, glass fiber, glass mats, etc., as evidenced by greatly improved flexural strength and modulus even after prolonged water immersion.

By experimental work we have obtained data which shows that increased flexural strength of over 35% dry and 100% wet, and increased modulus of over 50% dry and 100% wet can be readily obtained by the employment of a copolymer of an N-vinyl pyrrolidone with a diallyl ester of a dibasic acid. The use of an N-vinyl pyrrolidone in the aforestated percentages and the attainment of the improved properties, even after long water immersion, is surprising and totally unexpected, since, when more than twenty per cent of an N-vinyl pyrrolidone is used, the glass laminates prepared therefrom have less strength than glass laminates prepared from polymers of diallyl phthalate and other diallyl esters of dibasic acids.

The N-vinyl pyrrolidones employed in preparing the copolymers with diallyl esters of dibasic acids are characterized by the following general formula:

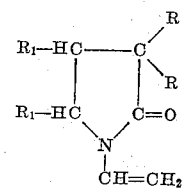

wherein R represents either hydrogen or a methyl group and R₁ represents either hydrogen, methyl or ethyl. As specific illustrations of the N-vinyl pyrrolidones, the following may be mentioned:

N-vinyl-2-pyrrolidone
N-vinyl-5-methyl pyrrolidone
N-vinyl-5-ethyl pyrrolidone
N-vinyl-3,3-dimethyl pyrrolidone
N-vinyl-3-methyl pyrrolidone
N-vinyl-4-methyl pyrrolidone
N-vinyl-4-ethyl pyrrolidone As illustrative examples of diallyl esters of both saturated and unsaturated dibasic acids including their anhydrides which are copolymerized with the N-vinyl pyrrolidone, the following may be mentioned:

Unsaturated dibasic acids or anhydrides:
    Maleic
    Ethyl maleic
    Citraconic
    Muconic
    Fumaric
    Aconitic
    Mesaconic
    Itaconic
    Monochloromaleic
    Dichloromaleic Saturated dibasic acids or anhydrides:
    Adipic
    Azelaic
    Phthalic
    Sebacic
    Dodecyl succinic
    Succinic
    Tetrachlorophthalic
    Hexahydrophthalic
    1,4,5,6,7,7-hexachlorobicyclo (2.2.1.)-heptane-2,3-dicarboxylic
    Malic While we prefer to employ the above saturated and unsaturated diallyl esters in the form of their diallyl esters, the mono-esters, such as mono-allyl esters and mixtures of mono and diallyl esters may also be employed to give similarly satisfactory results. In view of this modification, the term "allyl esters of dibasic acids"

as employed herein and the appended claims, we intend to include the mono and diallyl esters and mixtures thereof. Similarly, by the term "N-vinyl pyrrolidone" we intend to include only those characterized by the foregoing general formula and obvious equivalents thereof.

The copolymers of allyl esters and N-vinyl pyrrolidone are prepared either by copolymerization in bulk, in emulsion, or in solution. The first step is to copolymerize the monomers to an intermediate, or "B" Stage, at which time the resulting pre-polymer is still soluble in suitable organic solvents, such as benzene, dioxane, acetone, methyl ethyl ketone, dimethyl formamide, pyrrolidone, butyrolactone, tetrahydrofuran, ethylacetate, ethylene dichloride, etc., and mixtures thereof. The solution of the pre-polymer is then compounded with glass fibers and the like, any solvent present permitted to evaporate, and the composition converted to the insoluble and infusible stage by additional heat and/or catalyst cure.

The catalysts used in the process of preparing the pre-copolymers and in the final curing are the usual catalysts which include organic peroxide, peracids, hydroperoxides and the like. Compounds of this type include benzoyl peroxide, lauroyl peroxide, tertiary butyl perbenzoate, 1,1'-hydroperoxy diglycol, hexyl peroxide, methyl ethyl ketone peroxide, tertiary butyl peroxide, α,α-azodiisobutyronitrile and the like. In addition to the foregoing catalysts, accelerators such as dimethyl aniline, diethyl aniline, dimethyl-p-toluidine or any other equivalent catalyst known to the art may be employed to increase the curing effect of the catalyst in the copolymer resin. The quantity of accelerator may range from 0.1 to 5 per cent by weight of the allyl ester employed.

By the term "fibrous glass material" as employed in the appended claims, we include glass cloth of any weave, glass fibers, glass mats, roving, glass strands, chopped glass strands, and the like.

The following examples will illustrate the manner in which the copolymers of the present invention are prepared and how they may be employed as laminating agents for sheets of fibrous glass material and the results obtained therefrom. All the parts given are by weight.

Example I 120 parts diallyl phthalate, 180 parts dioxane and 3 parts of tertiary butyl perbenzoate were heated to slow reflux, under agitation, and heating continued for two and one-half hours. A small sample was taken, cast on glass, and the dioxane permitted to evaporate from the film. The residual film was a viscous liquid. Three parts of tertiary butyl perbenzoate were added and refluxing continued for an additional 4½ hours. A sample after evaporation left a soft, slightly tacky film. One and one-half parts of tertiary butyl perbenzoate were then added and refluxing continued for an additional three hours. A sample after evaporation left a soft, tack-free film. The batch, a solution, was cooled rapidly to room temperature. It had a viscosity of less than A, on the Gardner-Holdt scale.

Example II 108 parts diallyl phthalate monomer, 12 parts N-vinyl-2-pyrrolidone, 180 parts of dioxane, and 3 parts of tertiary butyl perbenzoate were heated to slow reflux under agitation. After two and one-half hours heating, a sample was taken as described in Example I. The residual film was a viscous liquid. 3 parts of tertiary butyl perbenzoate were added and refluxing continued for an additional four hours. A sample after evaporation left a soft, very slightly tack film. One and one-half parts of tertiary butyl perbenzoate were then added and refluxing continued for an additional three hours. A sample evaporated left a moderately tough, tack-free film. The batch, a solution, was cooled rapidly to room temperature and had a viscosity of less than A on the Gardner-Holdt scale.

Example III 101 parts diallyl phthalate monomer, 19 parts N-vinyl-2-pyrrolidone, 3 parts tertiary butyl perbenzoate, and 180 parts of dioxane were heated to slow reflux under agitation. The heating was continued for two and one-quarter hours. After evaporation a residual film was obtained which was in the form of a viscous liquid. 3 parts tertiary butyl perbenzoate were then added and refluxing continued for an additional three and three-quarter hours. A sample was evaporated, leaving a tack-free tough film. The batch, a solution, was cooled rapidly to room temperature. It had a viscosity of A on the Gardner-Holdt scale.

Example IV 85 parts diallyl phthalate, 35 parts N-vinyl-2-pyrrolidone, 180 parts dioxane, and 3 parts of tertiary butyl perbenzoate were heated to slow reflux under agitation, and heating continued for two and one-quarter hours. The sample was evaporated and the residual film yielded a viscous liquid. Heating was continued for two and one-half hours, during which time the viscosity increased visibly. A sample was taken and evaporated. It left a moderately hard, tack-free film. The batch was cooled rapidly to room temperature. It had a viscosity of D on the Gardner-Holdt scale.

Example V 120 parts diallyl hexachloroendomethylenetetrahydrophthalate, 180 parts dioxane, and 3 parts of tertiary butyl perbenzoate were heated to slow reflux with agitation and heating continued for four hours. A sample was taken and evaporated as described in Example I. The residual film was soft and almost tack-free. 3 parts of tertiary butyl perbenzoate were then added and refluxing continued for an additional four hours. A sample evaporated as described above left a moderately soft tack-free film. The batch was cooled to room temperature and had a viscosity of less than A on the Gardner-Holdt scale.

Example VI 110 parts diallyl hexachloroendomethylenetetrahydrophthalate, 10 parts N-vinyl-2-pyrrolidone, 180 parts dioxane, and 3 parts of tertiary butyl perbenzoate were heated to slow reflux under agitation. After three and one-half hours a sample was taken as described in Example I. The residual film was soft and tack-free. 3 parts of tertiary butyl perbenzoate were then added and refluxing continued for an additional four hours. The final sample evaporated as described in Example I left a firm tack-free film. The batch, a solution, was cooled to room temperature and had a viscosity of less than A on the Gardner-Holdt scale.

Example VII

The solution obtained as in Example I was mixed with four times its volume of methanol. A white precipitate was formed which was filtered and washed with methanol. It was then dried at room temperature in vacuo to yield a white, free flowing powder. It was soluble in dioxane.

Example VIII

The pre-polymer solution prepared as described in Example II was mixed with four times its volume of methanol and the precipitated solid resin filtered, washed and dried as described in Example VII. The dry, free flowing white powder was analyzed for nitrogen and showed 1.25% nitrogen. This analysis corresponds to a copolymer of 90% diallyl phthalate and 10% vinyl pyrrolidone.

Example IX

A pre-polymer solution prepared as in Example III was mixed with four times its volume of methanol and the dry, solid, free-flowing white polymer powder prepared as shown in Example VII. The polymer was analyzed and showed 1.98% nitrogen. This corresponds to a copolymer of 84.2% diallyl phthalate and 15.8% N-vinyl-2-pyrrolidone.

Example X

To a pre-polymer solution, prepared as per Example IV, methanol was gradually poured to the solution until six times its volume had been added. A milky emulsion was formed, which did not precipitate any copolymeric resin. A small sample was gradually diluted with methanol, up to fifty to one, without any resin precipitation. To the emulsion containing six parts methanol, one part of water was added gradually. A soft, resinous material separated, which eventually congealed on the bottom of the container. The supernatant liquid was decanted and the resin dried at room temperature. Chemical analysis showed 3.42% nitrogen. Theory for nitrogen is 3.64%. This corresponds to a copolymer of 70.9% diallylphthalate and 29.1% N-vinyl-2-pyrrolidone.

Example XI

The pre-polymer solution prepared as described in Example VI was mixed with six times its volume of methanol. A white precipitate formed which was filtered and washed repeatedly with methanol, then dried at room temperature in vacuo. A dry, free flowing, white powder of the copolymer of diallyl hexachloroendomethylene-tetrahydrophthalate and N-vinyl-2-pyrrolidone was obtained. It was analyzed for nitrogen and showed 1.04% nitrogen. This analysis corresponds to a copolymer at 91.7% diallyl hexachloroendomethylenetetrahydrophthalate and 8.3% N-vinyl-2-pyrrolidone.

Example XII

The pre-polymer solution prepared as described in Example V was mixed with five times its volume of methanol. A white precipitate was formed which was washed and dried as described in Example VII. The dry powder was white and free flowing.

Six individual 40% solutions of the pre-polymers of Examples I to VI inclusive were dissolved in dioxane, to each one of which had been added 0.8% of tertiary butyl perbenzoate equivalent to about 2% by weight of the pre-polymer was employed for uniformly coating six separate glass mats. The glass mats were so coated so as to contain 2½ times their weight of the 40% pre-polymer solution. The six coated mats were permitted to air dry overnight, during which time the dioxane odor disappeared. The following morning ¼" of laminates were prepared from each of the glass mats in a matched metal die by curing at 300° F. and 40 p. s. i. pressure for 13 minutes. The laminates obtained were very uniform and subjected to physical tests, the results of which are shown in the following table:

|  | Percent N-vinyl-2-pyrrolidone | Flexural Strength, p.s.i., ASTM D790-49T | Modulus, p.s.i., ASTM D790-49T | Resin/Glass Ratio |
|---|---|---|---|---|
| Pre-polymer of Example I. | 0 | Dry: 25,300 Wet: 10,430 | Dry: 865,000 Wet: 418,000 | 50/50 |
| Pre-polymer of Example II. | 10.0 | Dry: 34,400 Wet: 20,000 | Dry: 1,280,000 Wet: 895,000 | 50/50 |
| Pre-polymer of Example III. | 15.8 | Dry: 21,300 Wet: 19,000 | Dry: 859,000 Wet: 758,000 | 50/50 |
| Pre-polymer of Example IV. | 29.1 | Dry: 12,950 Wet: 2,690 | Dry: 545,000 Wet: 181,000 | 50/50 |
| Pre-polymer of Example V. | 0 | Dry: 28,200 Wet: 22,100 | Dry: 1,050,000 Wet: 940,000 | 50/50 |
| Pre-polymer of Example VI. | 8.3 | Dry: 36,100 Wet: 29,300 | Dry: 1,400,000 Wet: 1,140,000 | 50/50 |

Example XIII

Example II was repeated with the exception that N-vinyl-2-pyrrolidone was replaced by an equivalent amount of N-vinyl-4-methyl pyrrolidone, and the diallyl phthalate was replaced by an equivalent amount of diallyl maleate. The solution was cooled to room temperature and had a viscosity of less than A on the Gardner-Holdt scale.

Example XIV

Example III was repeated with the exception that N-vinyl-pyrrolidone was replaced by an equivalent amount of N-vinyl-3,3-dimethyl pyrrolidone, and the diallyl phthalate was replaced by an equivalent amount of an equal mixture of diallyl sebacate and monoallyl fumarate. The solution was cooled to room temperature and had a viscosity of less than A on the Gardner-Holdt scale.

Example XV

Example IV was repeated with the exception that the diallyl phthalate was replaced by an equivalent amount of diallyl adipate, and the N-vinyl-2-pyrrolidone was replaced by an equivalent amount of N-vinyl-5-methyl pyrrolidone. The solution was cooled to room temperature and had a viscosity of less than A on the Gardner-Holdt scale.

Example XVI

The pre-polymers of Examples XII to XV were treated as in Example VII and employed in coating glass mats as above described and subjected to physical tests. The results obtained were the same as in the foregoing table.

It is to be understood that by the term "allyl ester of a dibasic acid" as employed in the appended claims, we include a mixture of mono- and diallyl ester and a mixture of one or more diallyl esters of saturated or unsaturated dibasic acids.

We claim:

1. A laminated article comprising sheets of fibrous glass material bonded together with a copolymer of N-vinyl pyrrolidone and an allyl ester of a dibasic carboxylic acid, said copolymer containing in a weight ratio of 5–20% of an N-vinyl pyrrolidone and 80–95% of an allyl ester of a dibasic carboxylic acid.

2. A laminated article according to claim 1 wherein the N-vinyl pyrrolidone is N-vinyl-2-pyrrolidone.

3. A laminated article according to claim 1 wherein the N-vinyl pyrrolidone is N-vinyl-4-methyl-pyrrolidone.

4. A laminated article according to claim 1 wherein the N-vinyl pyrrolidone is N-vinyl-5-methyl-pyrrolidone.

5. A laminated article according to claim 1 wherein the N-vinyl pyrrolidone is N-vinyl-3,3-dimethyl-pyrrolidone.

6. A laminated article according to claim 1 wherein the N-vinyl pyrrolidone is N-vinyl-3-methyl-pyrrolidone.

References Cited in the file of this patent

UNITED STATES PATENTS

| 2,335,454 | Schuster et al. | Nov. 30, 1943 |
| 2,612,492 | Tewney | Sept. 30, 1952 |
| 2,667,473 | Morner et al. | Jan. 26, 1954 |